(12) United States Patent
Peng et al.

(10) Patent No.: US 9,679,594 B1
(45) Date of Patent: Jun. 13, 2017

(54) REFLECTOR CONFIGURED TO PREVENT REFLECTION FROM A RECORDING MEDIUM TO AN ENERGY SOURCE

(71) Applicant: Seagate Technology LLC, Cupertino, CA (US)

(72) Inventors: Chubing Peng, Eden Prairie, MN (US); Michael Allen Seigler, Eden Prairie, MN (US); Weibin Chen, Bloomington, MN (US); Werner Scholz, Camberwell (AU)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/196,561

(22) Filed: Jun. 29, 2016

Related U.S. Application Data

(60) Provisional application No. 62/194,424, filed on Jul. 20, 2015.

(51) Int. Cl.
  *G11B 5/02* (2006.01)
  *G11B 11/00* (2006.01)
  *G11B 5/48* (2006.01)
  *G02B 6/124* (2006.01)
  *G11B 5/00* (2006.01)

(52) U.S. Cl.
  CPC ............ *G11B 5/4866* (2013.01); *G02B 6/124* (2013.01); *G11B 2005/0021* (2013.01)

(58) Field of Classification Search
  CPC ... G11B 5/6076; G11B 5/6052; G11B 5/6088; G11B 2005/0021; G11B 5/3961; G11B 5/3945; G11B 5/4866; G11B 5/5526; G11B 11/10532; G11B 11/10543; G11B 11/10554; G11B 5/314
  USPC ............ 360/59, 313, 75, 66, 67, 234, 234.3; 369/13.13, 13.33
  See application file for complete search history.

(56) References Cited

U.S. PATENT DOCUMENTS

| | | |
|---|---|---|
| 7,940,486 B2 | 5/2011 | Shimazawa et al. |
| 8,248,896 B1 | 8/2012 | Yuan et al. |
| 8,873,352 B1 | 10/2014 | Jandric et al. |
| 8,908,481 B1 * | 12/2014 | Miyamoto ............ G11B 5/314 369/13.33 |
| 2011/0228651 A1 | 9/2011 | Gage et al. |
| 2013/0286805 A1 | 10/2013 | Macken et al. |
| 2016/0118069 A1 | 4/2016 | Yang et al. |
| 2016/0118070 A1 | 4/2016 | Yang et al. |

OTHER PUBLICATIONS

U.S. Appl. No. 15/007,772, filed Jan. 27, 2016, Duda et al.

* cited by examiner

*Primary Examiner* — Nabil Hindi
(74) *Attorney, Agent, or Firm* — Hollingsworth Davis, LLC

(57) ABSTRACT

An apparatus includes a waveguide that has a core between the first and second cladding layers. A near-field transducer in the first cladding layer is configured to receive the energy from the waveguide and deliver the energy to a recording medium. A reflector in the second cladding layer is configured to reduce reflection of the energy from the recording medium back to an energy source.

20 Claims, 15 Drawing Sheets

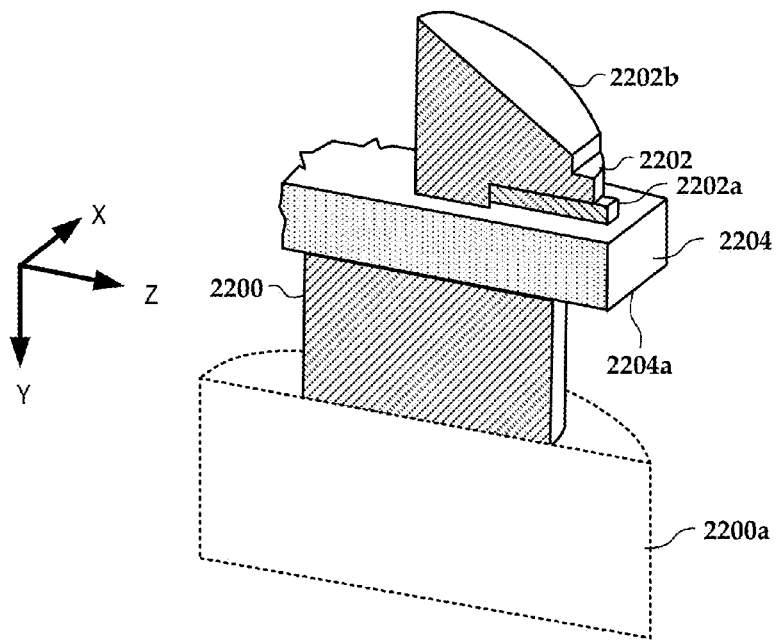
FIG. 22
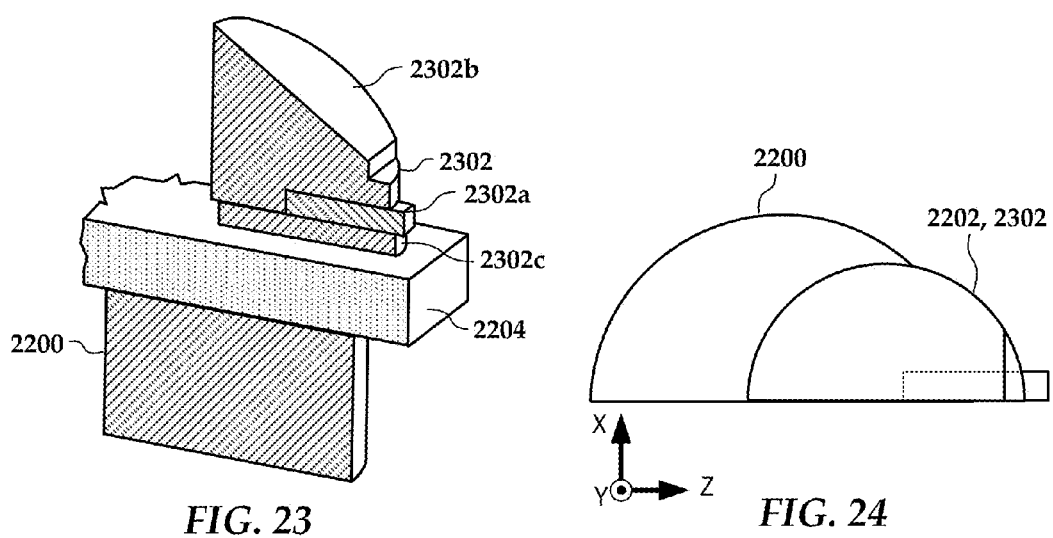
FIG. 23
FIG. 24

US 9,679,594 B1

REFLECTOR CONFIGURED TO PREVENT REFLECTION FROM A RECORDING MEDIUM TO AN ENERGY SOURCE

RELATED PATENT DOCUMENTS

This application claims the benefit of Provisional Patent Application Ser. No. 62/194,424 filed on Jul. 20, 2015, to which priority is claimed pursuant to 35 U.S.C. §119(e), and which is incorporated herein by reference in its entirety.

SUMMARY

The present disclosure is related to a reflector configured to reduce reflection from a recording medium to an energy source. In one embodiment, an apparatus includes a waveguide that delivers energy from an energy source. The waveguide has a first cladding layer, a second cladding layer, and a core between the top cladding layer and the bottom cladding layer. A near-field transducer is configured to receive the energy from the waveguide and deliver the energy to a recording medium. A reflector is in the second cladding layer. The reflector is configured to reduce reflection of the energy from the recording medium back to the energy source.

In another embodiment, an apparatus includes a solid immersion mirror proximate a write pole with a near-field transducer located at a focal region of the solid immersion mirror. A curved reflector is positioned centrally within the solid immersion mirror in a bottom cladding layer. The curved reflector reflecting the energy away from the near-field transducer. In yet another embodiment, an apparatus includes a reflector in a second cladding layer of a waveguide. The reflector overlaps a near-field transducer and is configured to move a waveguide mode profile of the energy towards the near-field transducer.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

FIGS. 22 and 23 are perspective view showing a mode-shaping reflector according to example embodiments;

FIG. 24 is a plan view of the embodiments shown in FIGS. 22 and 23;

DETAILED DESCRIPTION

The present disclosure is generally related to an apparatus (e.g., a write head) having a waveguide that delivers light from an energy source (e.g., laser diode) to a near-field transducer (NFT). An NFT is used in data recording referred to as heat-assisted magnetic recording (HAMR), also referred to as energy-assisted magnetic recording (EAMR), thermally-assisted magnetic recording (TAMR), and thermally-assisted recording (TAR). The NFT may also be referred to as a plasmonic transducer, plasmonic antenna, near-field antenna, nano-disk, nan-patch, nano-rod, etc. Light coupled to the NFT generates a surface plasmon field. The surface plasmons are directed out of a surface of the write head onto a magnetic recording medium. This creates a hotspot on the recording medium, lowering its magnetic coercivity and enabling a local magnetic field generated by a write pole to write data to the hotspot.

While the light delivery is designed to couple light from the energy source through the waveguide to the NFT and finally to the magnetic medium as efficiently as possible, reflections back to the light source through the waveguide occur at discontinuities where impedance is not matched, for instance, at the entrance of the slider, at the writer, and in particular, at the interface between heads and medium. Light reflected back to the energy source may lead to unwanted modulation of the energy source (also referred to as optical feedback). Optical feedback may cause laser instability, which can be seen as jumps in optical output and increases in dynamic intensity noise. Laser instability can result in sudden jump and jitters of the magnetic transitions written to the recording medium.

In embodiments described below, a write head includes waveguide features that are designed to reduce optical feedback of energy to an energy source (e.g., a laser diode). This may involve, among other things, placing one or more reflectors and/or absorbers at strategic regions around a waveguide that delivers light to a near-field transducer. While these features may be used in any nanoscale energy delivery system, the features are discussed below in the context of a HAMR write head.

Figure 1:
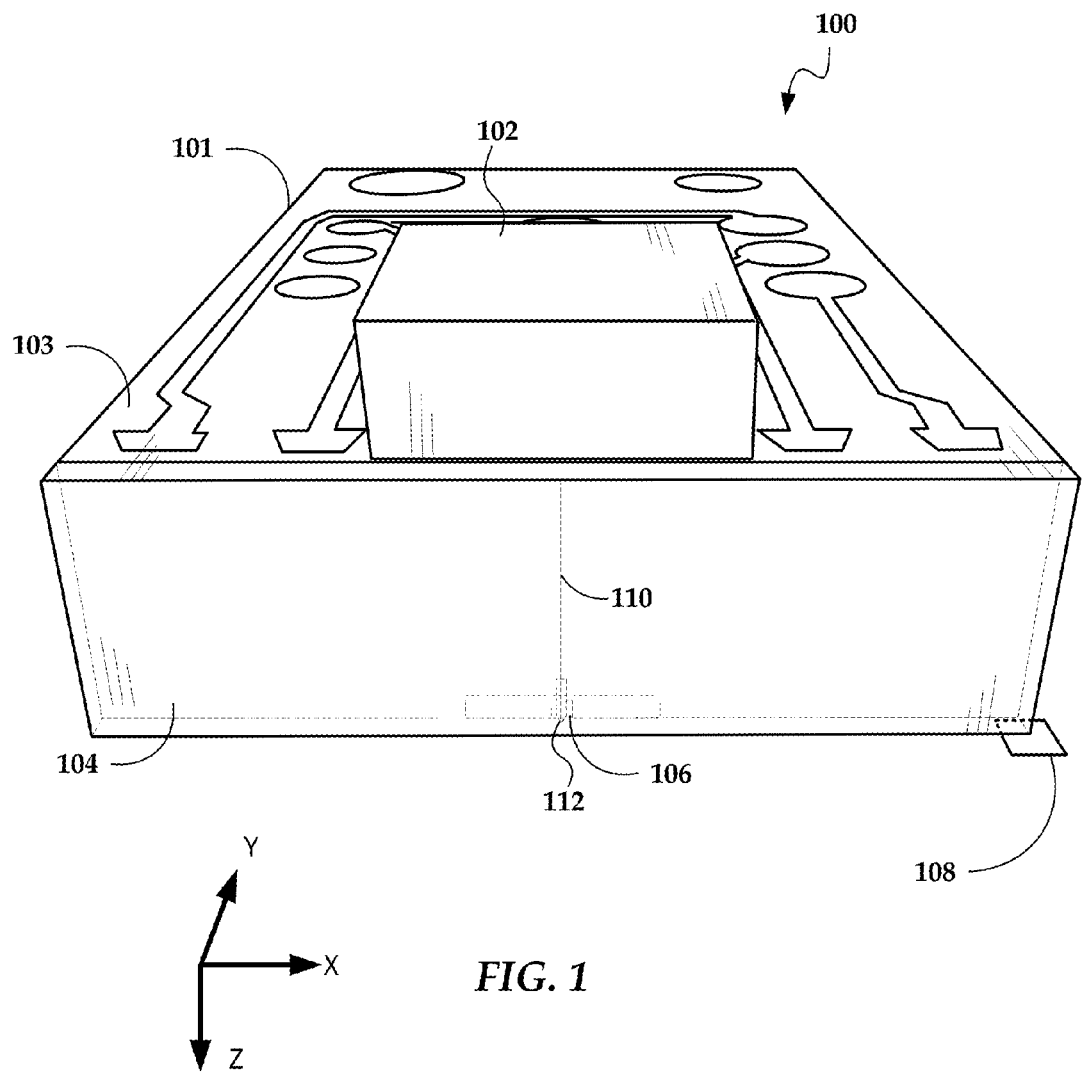
FIG. 1 is a perspective view of a slider assembly according to an example embodiment.

In reference to FIG. 1, a perspective view shows a HAMR write head 100 according to an example embodiment. The write head 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers energy (e.g., light of wavelength just above the visible range) to a region proximate a HAMR read/write transducer 106, which is located near the media-facing surface 108. The energy is used to heat the recording media as it passes by the read/write transducer 106. Optical coupling components, such as a waveguide system 110, are formed integrally within the slider body 101 (near a trailing edge surface 104 in this example) and function as an optical path that delivers energy from the laser diode 102 to the recording media via a near-field transducer 112. The near-field transducer 112 is located near the read/write transducer 106 and causes heating of the media during recording operations.

The near-field transducer 112 may be made of noble metals (Au, Ag, Cu, Al, Rh, Ir, Pt,), conducting oxides (ZrN, AlZnO) and/or alkali-noble intermetallics. The near-field transducer interacts with the light propagating in the waveguide efficiently through surface-plasmon excitation at the interface between the metal and dielectrics. This interaction condenses the electromagnetic field into a tiny spot, which tunnels into a recording medium, raising the media temperature locally by absorption.

The laser diode 102 in this example may be configured as either an edge-emitting laser or surface-emitting laser. Generally, the edge-emitting laser emits light from—one side of the laser and a surface emitting laser emits light in a direction perpendicular to a surface of the laser body. An edge-emitting laser may be mounted on the top surface 103 of the slider body 101 (e.g., in a pocket or cavity) such that the light is emitted in a direction toward the media-facing surface. A mirror or the like may be used to direct the light towards the waveguide system 110. In other embodiments, an edge-emitting laser may be mounted on a submount to direct the light towards the waveguide system 110 without requiring a mirror.

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the write head 100, and coupled to the slider by way of optic fiber and/or waveguide. An input surface of the slider body 101 may include a grating or other coupling feature to receive light from the laser via the optic fiber and/or waveguide.

Figure 2:
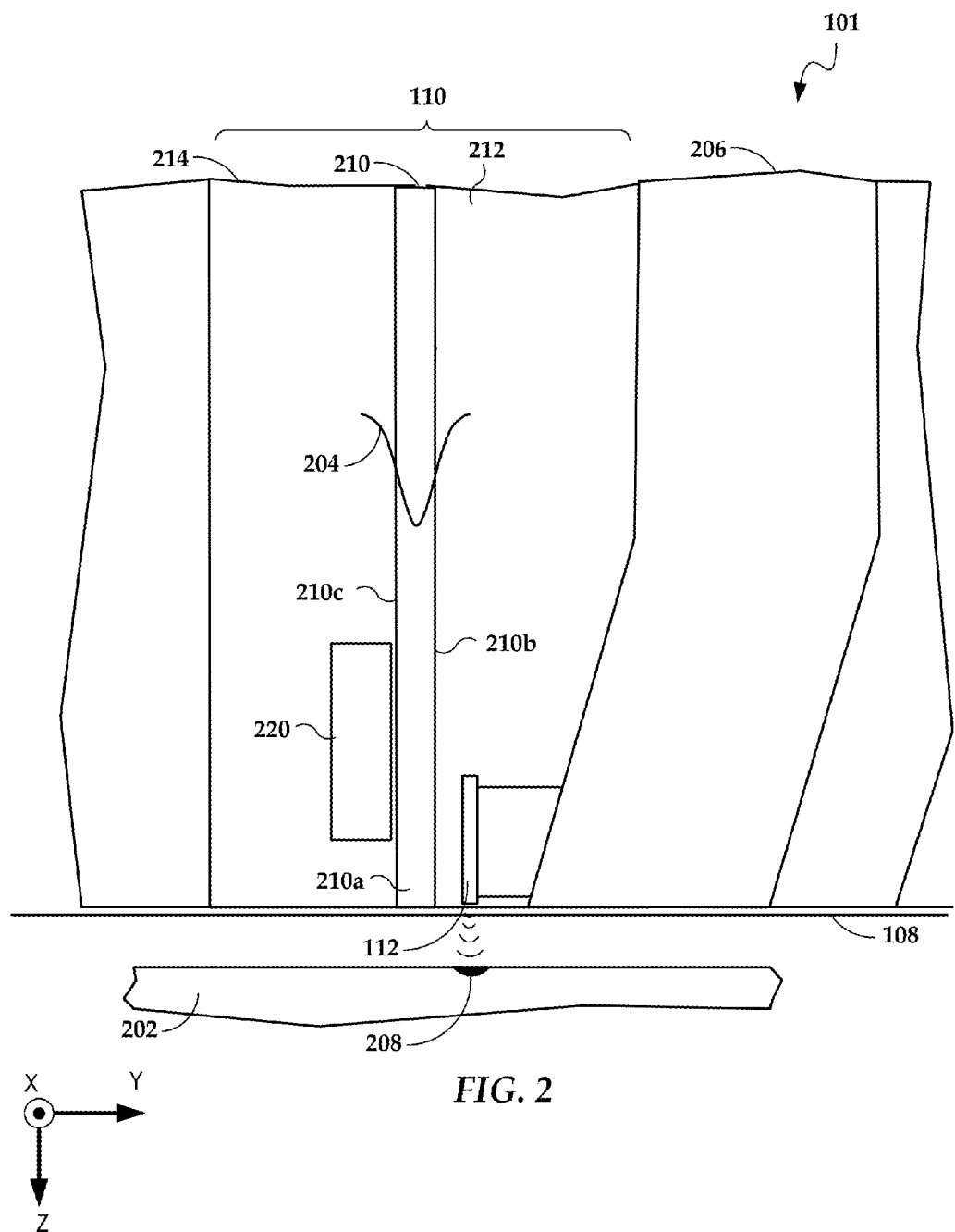
FIG. 2 is a cross-sectional view illustrating details of a light path according to an example embodiment.

In FIG. 2, a cross-sectional view illustrates portions of the slider body 101 near the near-field transducer 112 according to an example embodiment. In this view, the near-field transducer 112 is shown proximate to a surface of magnetic recording medium 202, e.g., a magnetic disk. The waveguide system 110 delivers electromagnetic energy 204 to the near-field transducer 112, which directs the energy 204 to create a small hotspot 208 on the recording medium 202. A magnetic write pole 206 causes changes in magnetic flux near the media-facing surface 108 in response to an applied current. Flux from the write pole 206 changes a magnetic orientation of the hotspot 208 as it moves past the write pole 206 in the downtrack direction (y-direction).

The waveguide system 110 includes a core layer 210 surrounded by top and bottom cladding layers 212, 214. The core layer 210 and cladding layers 212, 214 may be made from dielectric materials such as $Al_2O_3$, SiOxNy, $SiO_2$, $Ta_2O_5$, $TiO_2$, ZnS, SiNx, $Nb_2O_5$, AlN, $Hf_2O_3$, $Y_2O_3$, SiC, GaP, Si, etc. Generally, the dielectric materials are selected so that the refractive index of the core layer 210 is higher than refractive indices of the cladding layers 212, 214. This arrangement of materials facilitates efficient propagation of light through the waveguide system 110.

A first end of the core 210 (not shown) extends along the light propagation direction (z-direction) where it is directly or indirectly coupled to a light/energy source. For example, a laser diode may have an output facet that is coupled face-to-face with an end of the waveguide core 210. In other configurations, optical components such as lenses, mirrors, collimators, mode converters, etc., may be coupled between the waveguide core 210 and the light/energy source. In either case, the energy coupled into the first end of the waveguide core 210 propagates to a second end 210a that is proximate the near-field transducer 112. In this configuration, the near-field transducer 112 is located on a first side 210b of the waveguide core 210, e.g., in first cladding layer 212. In other configurations, the near-field transducer 112 may be butted against an end of the waveguide core 210 instead of being in a cladding layer. In yet other configurations, instead of the illustrated near-field transducer 112, plasmonic material surrounds at least two opposite surfaces of the core 210 (e.g., configured as a channel waveguide core), which is tapered to small size near the media-facing surface 108. This tapered region forms an aperture-type-near-field transducer.

As indicated by region 220, a reflector is positioned on a second side 210c of the waveguide core 210, the second side 210c facing away from the first side 210b. The reflector 220 is configured to reduce (e.g., cancel, nullify) reflection of the energy from the recording medium 202 back to the energy source, e.g., laser diode 102 shown in FIG. 1. The reflector 220 may also cancel reflections from the near-field transducer 112. In this example, a projection of the reflector 220 onto a substrate-parallel plane (xz-plane in this coordinate system) at least partially overlaps the near-field transducer 112. In other embodiments, a reflector may be located further away from the near-field transducer 112 in the z-direction, e.g., proximate the energy source. In some configurations e.g., aperture-type, near-field transducer), the near-field transducer may be small enough in the light propagation direction that there is no overlay between the reflector and the near-field transducer. In other configurations, the near-field transducer 112 and reflector 220 may be located on opposite sides of the core 210, e.g., near-field transducer 112 may be in bottom cladding layer 214 and reflector 220 may be in top cladding layer 212.

Figure 3:
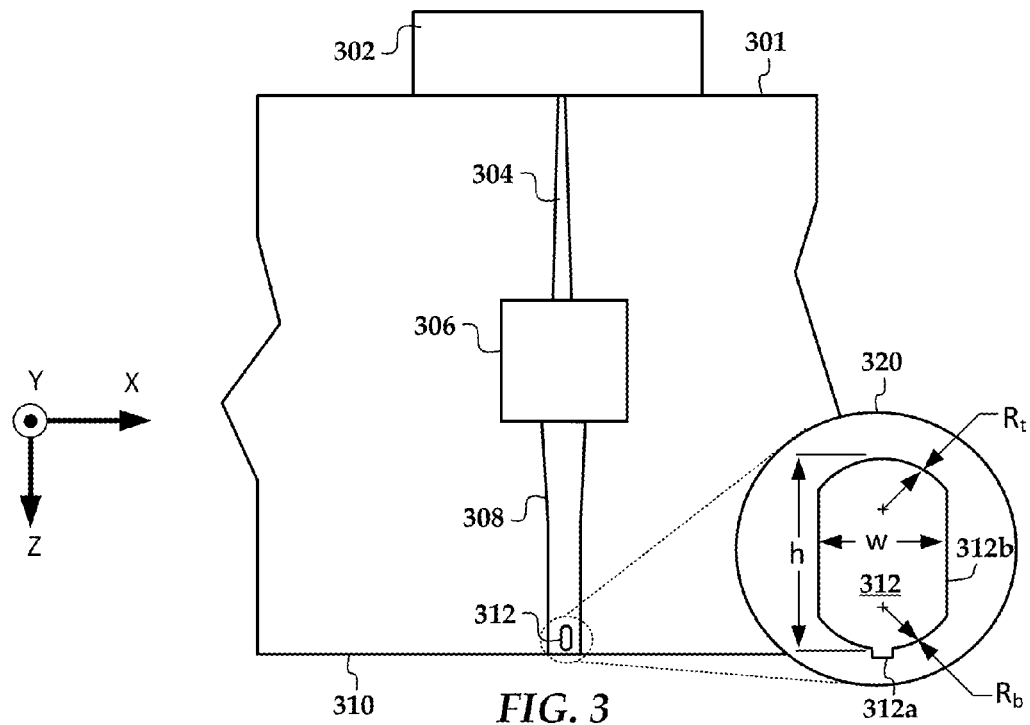
FIGS. 3 and 4 are cross-sectional views of light delivery configurations according to example embodiments.
Figure 4:
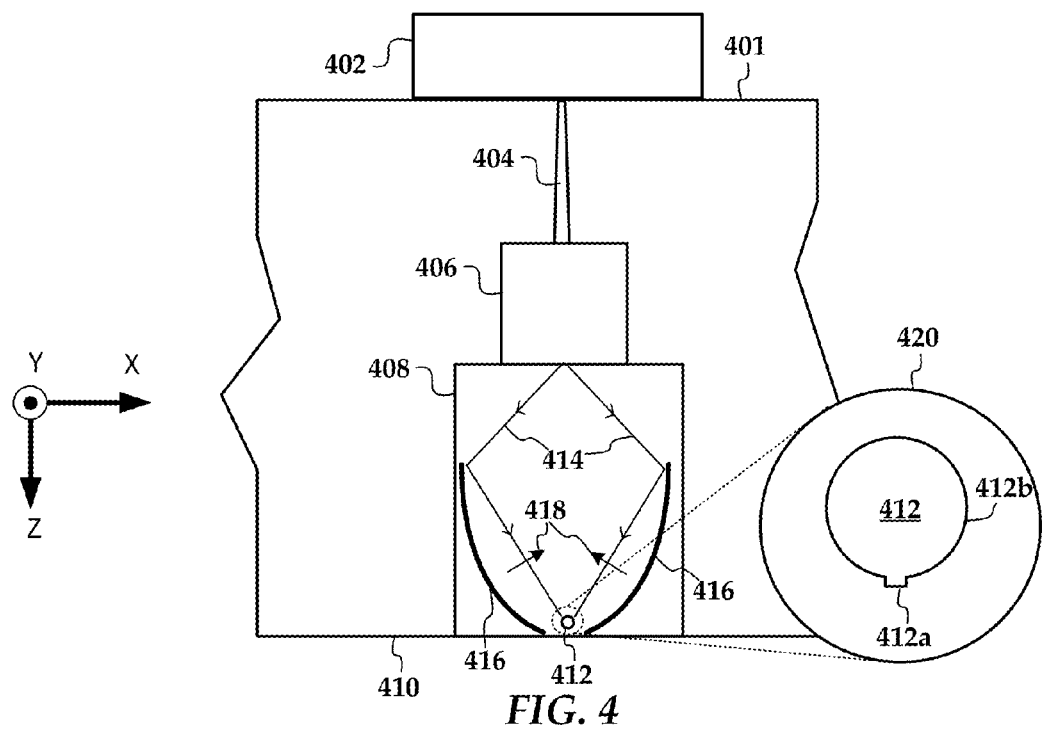

Generally, a reflector may be made from any reflective material, such as a metal. The reflector could be metallic, a dielectric, or a distributed reflector such as a distributed Bragg grating. The reflector may be also part of core, for instance, a distributed Bragg grating reflector. The various shapes, locations, and materials of example embodiments are discussed below. In FIGS. 3 and 4, block diagrams show two configurations for HAMR light delivery to near-field transducers according to example embodiments, in FIG. 3, light is emitted from a laser diode 302 where it is coupled into a three-dimensional channel waveguide of a slider body 301 by a waveguide input coupler 304. A waveguide mode-order converter and/or a polarization rotator 306 may be integrated in the light path for near-field transducer excitation. The converter/rotator 306 may convert the light from a fundamental transverse magnetic (TM) or transverse electric (TE) mode (e.g., $TM_{00}$ or $TE_{00}$) to a higher order mode (e.g., $TE_{10}$). Light exiting the converter/rotator 306 propagates through a channel waveguide 308 all the way to the media-facing surface 310 to excite a near-field transducer 312. As will be shown in FIGS. 5 and 6, a reflector is placed proximate the near-field transducer 312, e.g., below the near-field transducer 312 in the y-direction and overlapping in the x- and z-directions.

As seen in the close up 320 of FIG. 3, the near-field transducer 312 includes an enlarged portion 312b with a stadium shape (e.g., an elongated rectangle with rounded ends). A peg 312a extends from the enlarged portion 312b towards the media-facing surface 310. The near-field transducer 312 may be used for a TE waveguide light delivery mode. e.g., $TE_{10}$. In embodiments discussed below, the dimensions are width w=400-nm, semi-cycle end radii $R_t=R_b$=200-nm, and height h=680-nm. The peg 312a is 40-nm wide along the x-direction (cross-track direction), 30-nm thick along y-direction (down-track direction), and 20-nm long along the z-direction (vertical direction).

In the configuration shown in FIG. 4, light is emitted from a laser diode 402 where it is coupled into a three-dimensional channel waveguide of a slider body 401 by a waveguide input coupler 404. A waveguide mode order converter and/oro polarization rotator 406 may be integrated in the light path for near-field transducer excitation. Light exiting the converter/rotator 406 is coupled to a slab waveguide 408, where it propagates freely parallel to the waveguide plane (xz-plane) but is confined normal to the waveguide plane by the slab waveguide 408. Light (represented by lines 414) is focused by a solid immersion mirror (SIM) 416 etched into the slab waveguide 408. The SIM 416 reflects the light 414 onto a near-field transducer 412 which is located at a focal region of the SIM 416. The light being directed onto the near-field transducer 412 causes plasmonic resonance which results in energy being directed out of the media-facing surface 410. Arrows 418 represent a polarization of the light 414 induced by reflection from the SIM 416. As will be shown in FIGS. 5 and 6, a reflector is placed proximate the near-field transducer 212, e.g., below the near-field transducer 212 in the y-direction and overlapping in the x- and z-directions.

As seen in the close up 420 of FIG. 4, the near-field transducer 412 includes a circular shaped enlarged portion 412b (e.g., disc) with a peg 412a that extends towards the media-facing surface 410. In embodiments discussed below, the disc diameter is 250-nm and the peg is 40-nm wide along the x-direction, 32-nm thick along the y-direction, and 20-nm long along the z-direction. While the shape of near-field transducer 412 may be useful with a SIM 416 because the SIM 416 reflects light in a direction normal to the circular edge of the disc, such a circular transducer shape may also be used in the configuration of FIG. 3.

Figure 5:
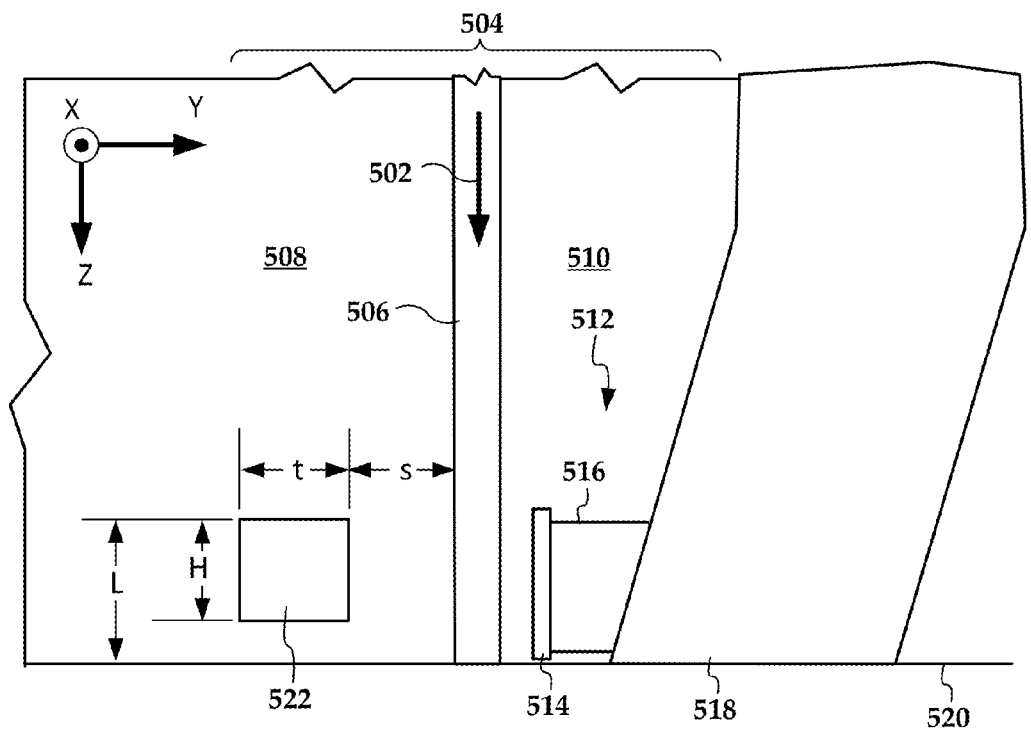
FIGS. 5 and 6 are block diagrams showing a reflector according to an example embodiment.
Figure 6:
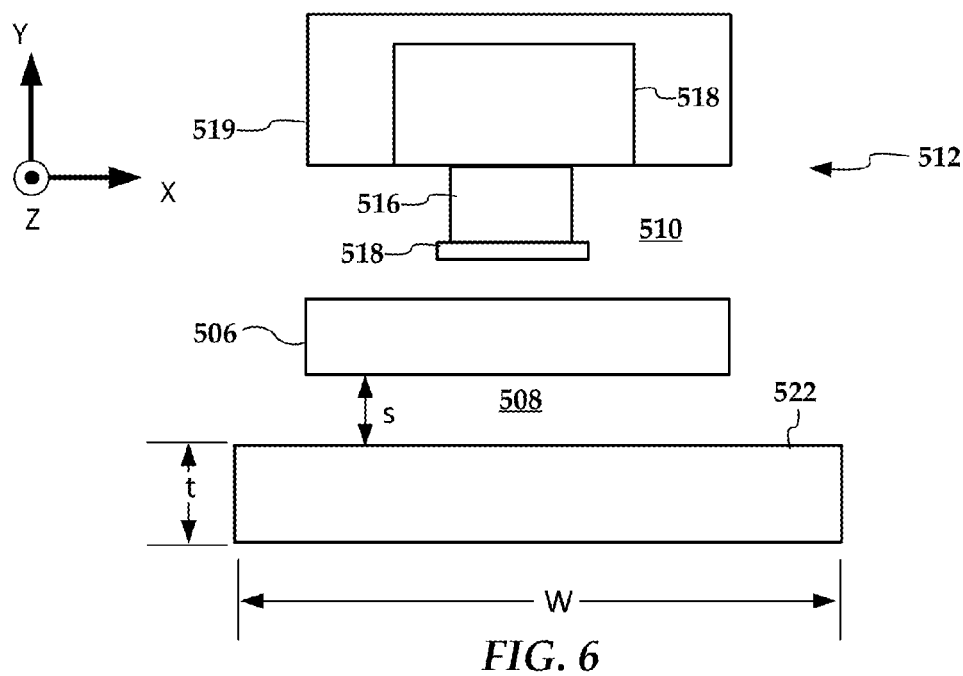

In reference now to FIGS. 5 and 6, block diagrams show a waveguide and near-field transducer near the media facing surface show examples of a reflector. As seen in FIG. 5, light 502 propagates through a waveguide 504 that includes a waveguide core 506 and claddings 508, 510. The core 506 may be formed, for example, of $TiO_2$, $Ta_2O_5$, $SiN_x$, $Nb_2O_5$, SiC, or ZnS, The claddings 508, 510 may be formed, for example, of $SiO_2$, $Al_2O_3$, $MgO_2$ or $SiON_x$. For purposes of description, the cladding 508 may be referred to as a bottom cladding layer and the cladding layer 510 may be referred to as a top cladding layer.

A writer 512 includes a near-field transducer 514, heat-sink 516, and magnetic pole 518 proximate a media-facing surface 520. As seen in FIG. 6, the write pole 518 is wrapped by a heat sink 519. The near-field transducer 514 may be configured as shown in MS. 3 or 4. The heat sink 516 may be formed, for example, of Cr, Ru, Au, or Rh, and the magnetic pole 518 may be formed of FeCo or FeCoNi. Part of the light 502 is transferred to and scattered by the writer 512. The rest of the light 502 still propagates along the waveguide 504 to the recording medium (not shown; see, e.g., recording medium 202 in FIG. 2). Upon reflection from the recording medium and from the writer 512, light returns back to the light source along the waveguide 504, causing laser instability.

To suppress the optical feedback, a reflector 522 is integrated in the bottom cladding layer 508. Light reflected from the reflector 522 will interfere with the reflections from the recording medium and from the writer 512. Under certain circumstances, the interference is destructive and the reflected light radiates out of the waveguide 504, in the same way as a Mach-Zehnder modulator, thus eliminating the optical feedback into the laser diode cavity. The reflector 522 is located in the bottom cladding layer 508 and behind the near-field transducer 514, which minimizes its impact on the near-field transducer efficiency. The reflector 522 is also proximate to the recording medium, minimizing the impact of light wavelength shift and achieving broadband suppression.

In one configuration discussed below, the reflector 522 is formed as a rectangular metallic plate with the following dimensions: width W along the x-direction, thickness t along the y-direction, and height H along z-direction. The plate reflector 522 has high reflection and minimal absorption in the near-infrared frequencies, such as a noble metal (e.g., Au, Ag). The reflector 522 is separated from the waveguide core 506 by spacing S and its top edge is L from the media-facing surface 520.

To demonstrate the effectiveness of the optical feedback suppression, an analysis was performed with reflector such as 522 configured as a gold block. For the analysis, the light wavelength $\lambda$=830-nm and waveguide cladding (both top and bottom) is silica, with index of refraction n=1.46. The near-field transducer is made of gold, with complex refractive index n=0.188+j 5.39. The heat sink thermally coupling the near-field transducer and write pole is also gold. The magnetic pole is made of Fe—Co alloy, n=3.17+j 3.95. The magnetic pole is 200-nm wide along the x-direction and 100-nm thick along the y-direction with a slope of 26.5 degrees from the waveguide plane (xz-plane). The magnetic pole is wrapped by a 600-nm wide Cr heat-sink, n=3.21+j 3.48. The near-field transducer to pole spacing at the media facing surface is 20-nm.

Two recording media were modeled for the analysis, designated below as Media A and Media B. Media A is a generic medium with Cu heat-sink. Media A has much greater reflection and lower absorption than Media B, in this modeling, Media A includes a 12.6-nm thick FePt recording, n=2.55+j 2.72, a 10-nm thick $MgO_2$ dielectric layer, n=1.70, and a 60-nm thick Cu layer, n=0.26+j 5.29, on a glass substrate, n=Media B includes an 8-nm thick carbon overcoat layer, n=2.084, a 8-nm thick recording layer, n=2.91+j 1.55, a 15-nm thick interlayer, as well as soft underlayer and heat-sink layers. The spacing between near-field medium and recording media is 8-nm, and n=1.21.

In one analysis, a first embodiment included the gold block reflector together with a near-field transducer as shown in FIG. 3, having an elongated shape in the xz-plane, two semi-circled ends, and a peg. The near-field transducer is placed in the top cladding layer and is 20-nm away from the waveguide core. The light delivery structure includes a three-dimensional channel guide with the first higher order mode, $TE_{10}$. The waveguide core is $TiO_2$, 120-nm thick along y direction and 750-nm wide along x direction. Graphs in FIGS. 7 and 8 show results for this first embodiment for Media A, and FIGS. 9-12 show results for Media B.

Figure 7:
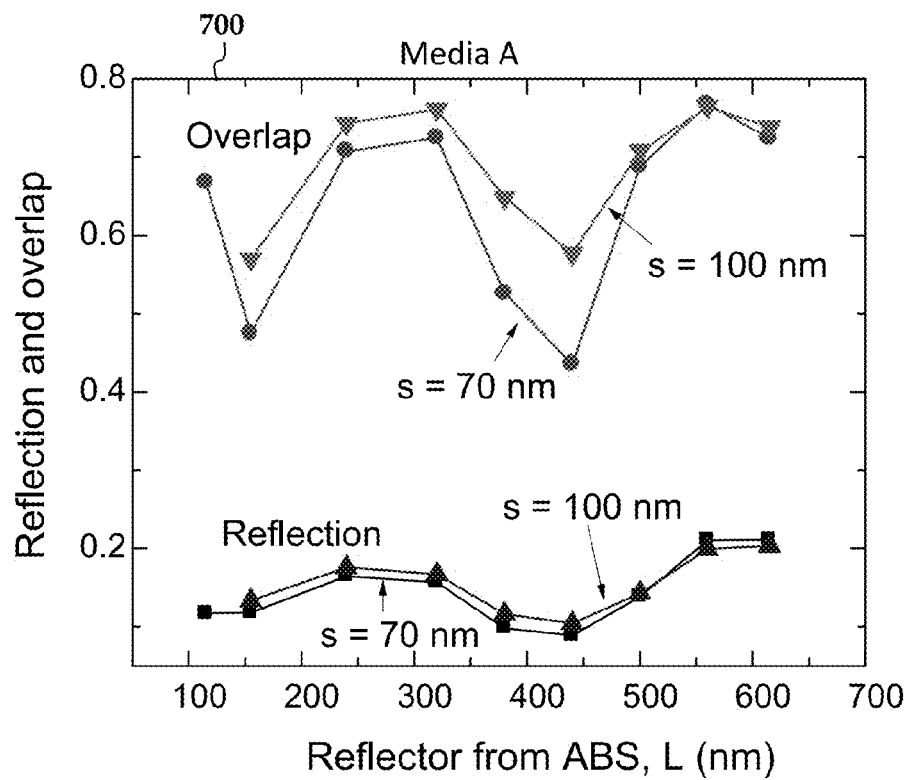
FIGS. 7-16 are graphs showing results of analyses of a write head according to an example embodiment.
Figure 8:
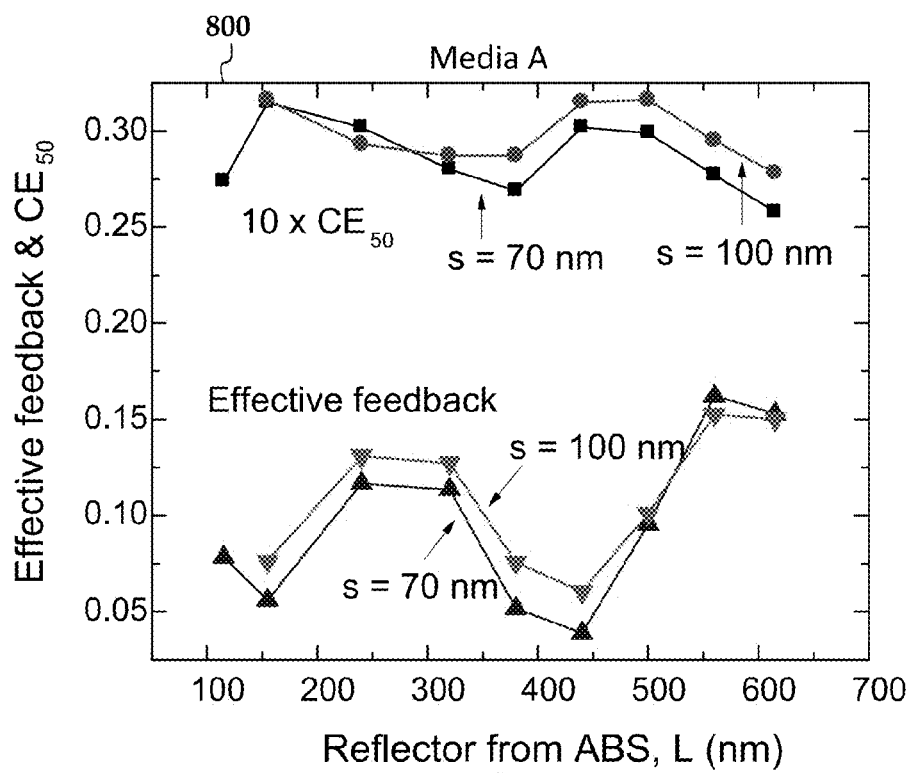

The graph 700 in FIG. 7 shows the reflection, R at a xy-plane at a distance of 400-nm away from the near-field transducer as a function of reflector position L from the media-facing surface (see FIG. 5). The graph 700 also shows the overlap (OVLP) between the reflected field and the incident $TE_{10}$ mode profile as a function of L. The graph 800 in FIG. 8 shows effective feedback and $CE_{50}$ for Media A as a function of reflector position L for this first embodiment. The effective feedback is the product of R and overlap from graph 700. The near-field transducer efficiency $CE_{50}$ is defined as the light absorption in the recording layer in a foot print of 50-nm by 50-nm. For both graphs 700 and 800, the separation s is either 70-nm or 10-nm as indicated, and the thickness t of the reflector is such that t+s=200-nm. In both graphs, reflector height H is about 120-nm.

Figure 9:
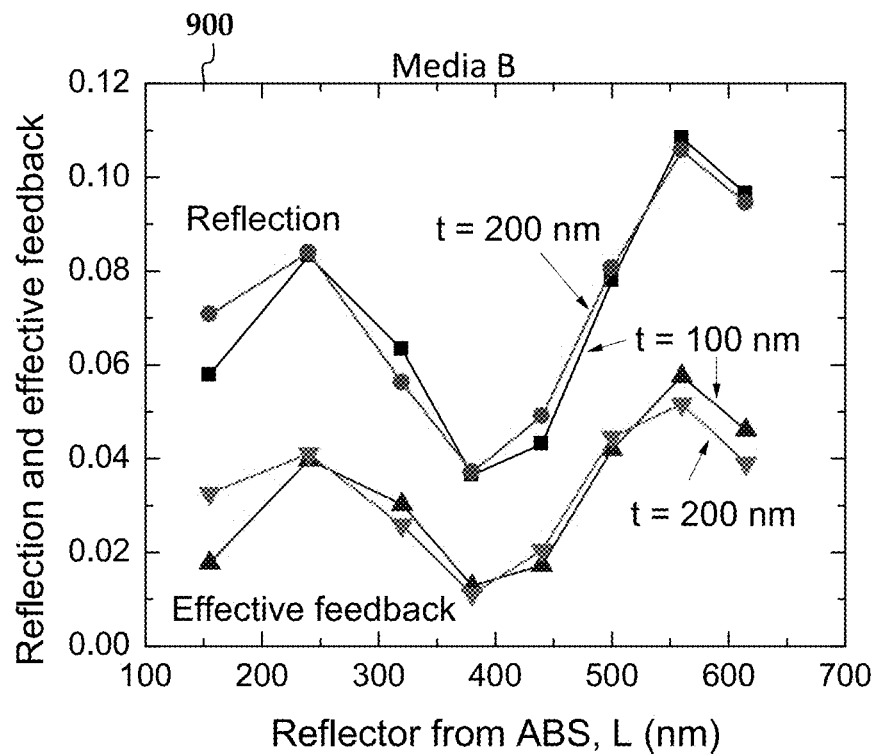
Figure 10:
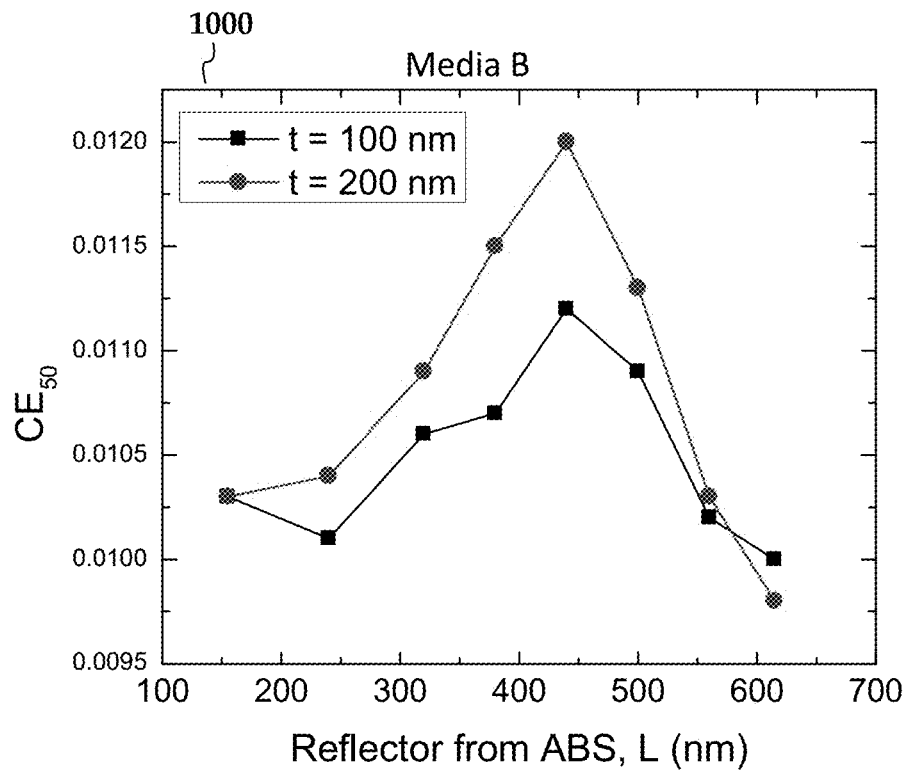
Figure 11:
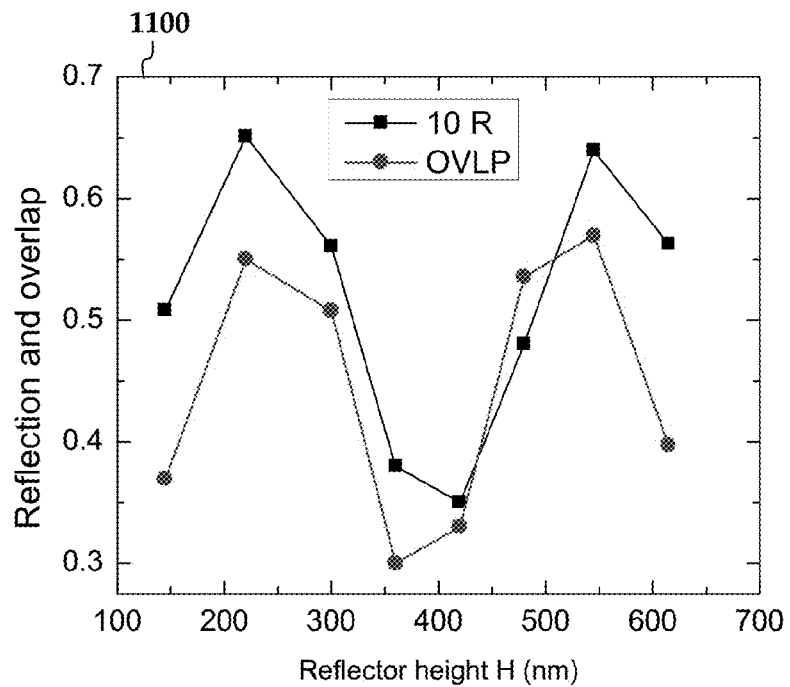
Figure 12:
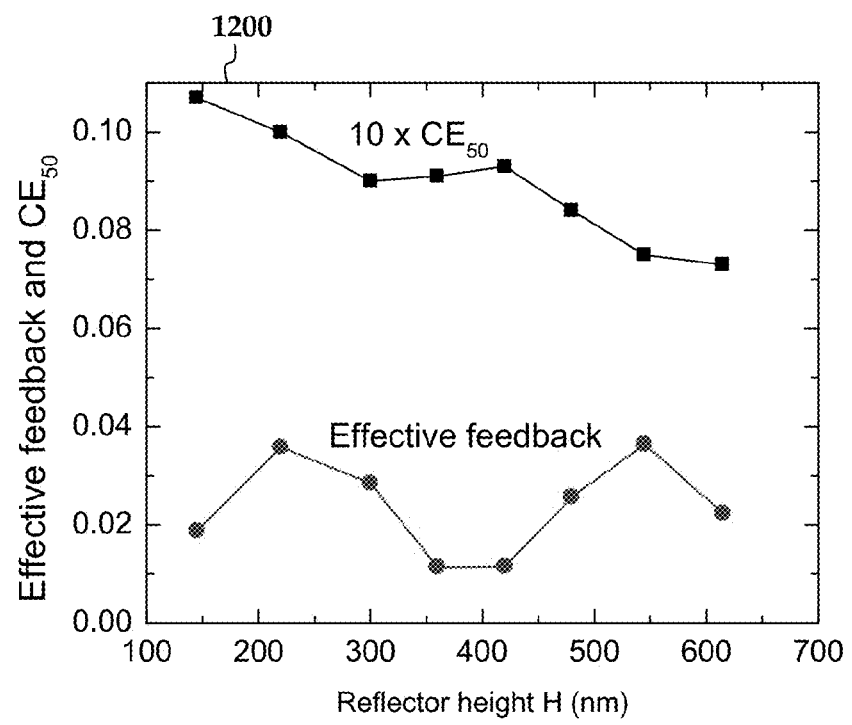

The graph 900 in FIG. 9 shows reflection R and effective feedback for Media B as a function of reflector position L. Note that in this case, two reflector thicknesses t are used, 100-nm and 200-nm, while separation s is fixed at 100-nm. The graph 1000 in FIG. 10 represents $CE_{50}$ as a function of L for these thicknesses. In both these cases, height H is 120-nm. The graph 1100 in FIG. 11 shows reflection and overlap as a function of reflector height H with thickness t=100-nm and separation S=100-nm. Similarly, graph 1200 in FIG. 12 shows effective feedback and $CE_{50}$ a function of reflector height H with thickness t=100-nm and separation S=100-nm.

On Media A, without a reflector, R=0.194, OVLP=0.795, so the effective feedback is 0.154. This means that 15.4% of the light will return back to the laser diode cavity. Note that 100% light delivery efficiency is assumed here. For this case, near-field transducer efficiency $CE_{50}$=0.031 With the reflector, optical feedback, including both reflection R and overlap, varies periodically with reflector distance L from the media-facing surface. The valley-valley distance ΔL~261-nm, corresponding to $\lambda/(2^*n_{eff})$=260-nm. Here $n_{eff}$ denotes the $TE_{10}$ waveguide mode index, 1.59. This means that the feedback without a reflector is mainly due to the reflection from media. At L=440-nm and S=70-nm, R=0.088, OVLP=0.4355, the effective feedback is 0.038, which is only about ¼ of that without a reflector. At this position, the near-field transducer $CE_{50}$=0.0302, only 3% lower than that without a reflector. Comparing the two separations s=100-nm and 70-nm, it is concluded that full feedback elimination is possible but with some near-field transducer efficiency penalties.

On Media B, without a reflector, R=0.082, OVLP=0.627, so effective feedback=5.11%, near-field transducer efficiency $CE_{50}$=0.0121. Once again it is seen that the feedback varies with reflector position L. The position with minimum feedback is only slightly different from that Media A, indicating the feasibility of one design functioning on different media. This difference in position is due to the differing reflection phase from different media. At L=380-nm and reflector thickness t=200-nm, R=0.037, OVLP=0.30, the effective feedback is only 1.11%, which is approximately ⅕ of that without a reflector. At this condition, near-field transducer $CE_{50}$=0.0115, nearly the same as the case without a reflector. If the reflector height H=L, as shown in FIGS. 11 and 12, similar feedback suppression can be obtained but with 24% reduction in near-field transducer efficiency. As expected, the reflector position L (=H) for minimum feedback is similar to that of L≠H.

Figure 13:
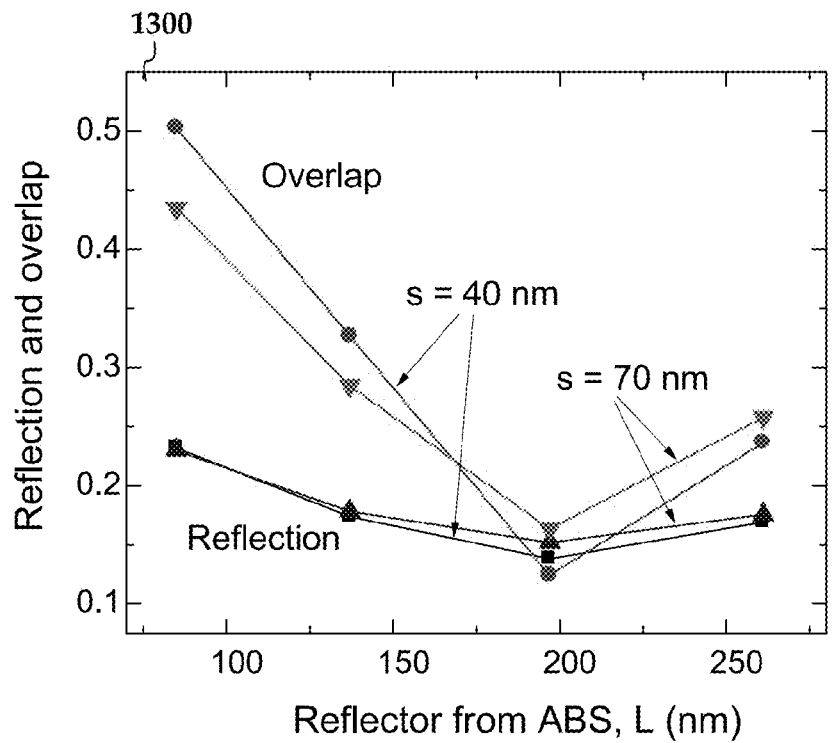
Figure 14:
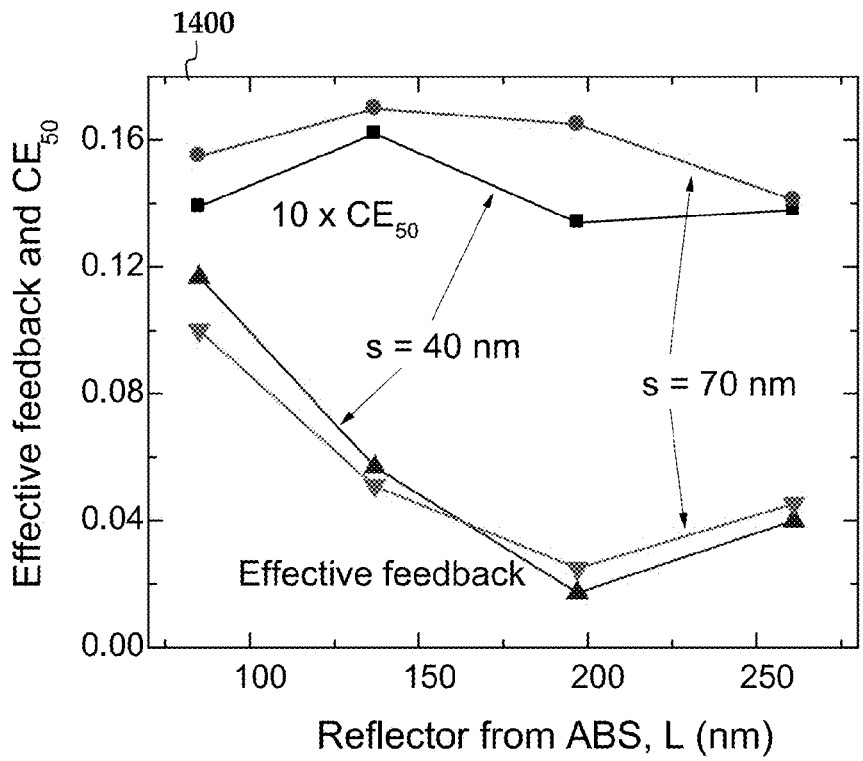
Figure 15:
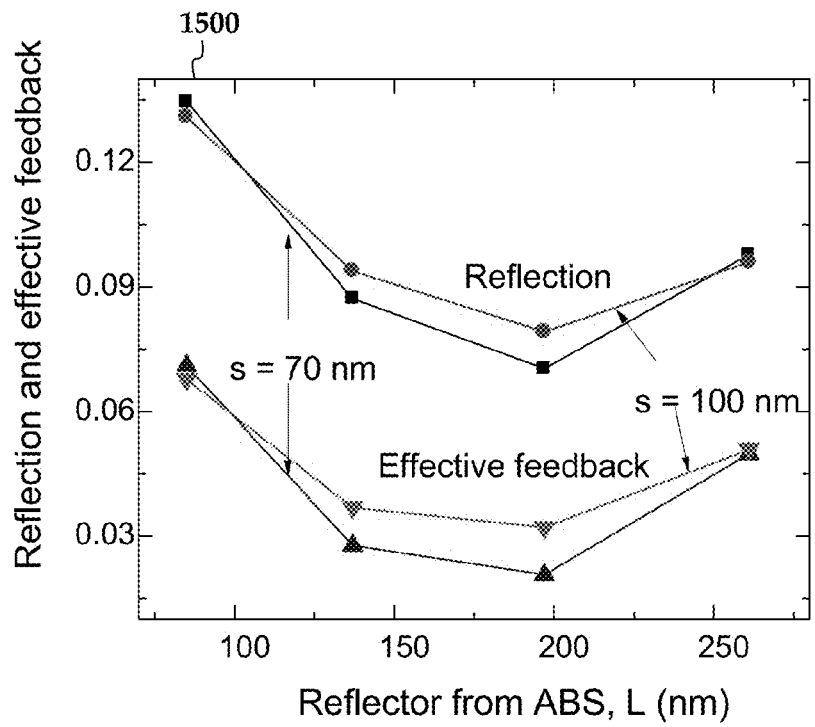
Figure 16:
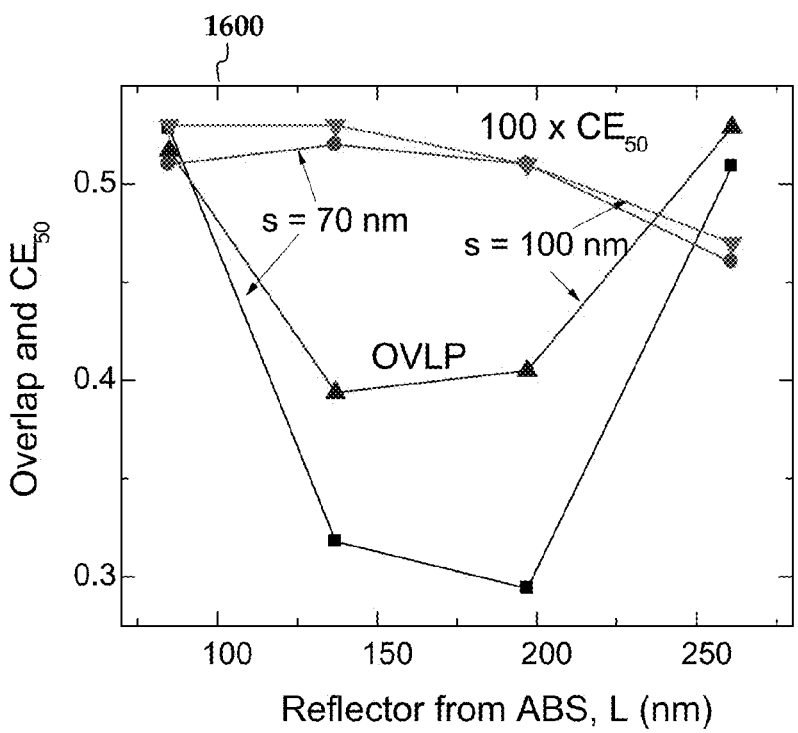

This modeling is repeated on a second embodiment which uses a disk-shaped near-field transducer with SIM focusing light delivery as shown in FIG. 4. The reflector is still a rectangular gold plate. The graphs in FIGS. 13-16 show the results. The graphs 1300 and 1400 in FIGS. 13 and 14 show results with Media A for a reflector with H ~85-nm high and t+s=200-nm. The graphs 1500 and 1600 in FIGS. 15 and 16 show the results for the same configurations with Media B. Note that about 25% incident beam is lost through the SIM bottom opening and its impact on feedback is not accounted in this modeling.

On Media A, without a reflector, reflection R=0.224, overlap OVLP=0.387, effective feedback=8.67%, near-field transducer efficiency $CE_{50}$=0.0152. With the reflector, both overlap and reflection reaches a minimum at reflector position L ~200-nm. At this position, the effective feedback drops to ~2.1%, which a factor of 4 reduction. Note that the reduction in overlap is the dominated contributor to this suppression. At separation S=70-nm, the near-field transducer efficiency is even slightly improved. With lower separation, s=40-nm, feedback suppression is greater but with decreasing near-field transducer efficiency.

On Media B, similar to the case with $TE_{10}$ waveguide mode light delivery, the position L for minimum feedback slightly shifts towards the ABS as compared to Media A. At the same reflector position, the feedback suppression is still significant on two significantly different media. On Media B, without a reflector, reflection R=0.117, overlap OVLP=0.615, effective feedback=7.19%, near-field transducer efficiency $CE_{50}$=0.0049. With the reflector, at position L=200-nm and separation s=70-nm, the effective feedback drops to 2%, with a reduction of 3.5. The near-field transducer efficiency is even slightly improved. It is also interesting that the effective feedback for the SIM light delivery is nearly the same for the two significantly different media. This behavior differs from the case with $TE_{10}$ waveguide mode light delivery.

As these results show, a reflector integrated in the cladding layer opposite to the near field transducer and close to the media-facing surface, can effectively suppress optical feedback with little penalty in near-field transducer efficiency. Other alternative designs can use different reflector shapes and different locations further away from the media-facing surface, e.g., such that the reflector does not overlap with the near-field transducer. For example, in third and fourth embodiments shown in FIGS. 17 and 18, configurations using a SIM for light delivery may include a curved reflector in the bottom cladding layer. For light delivery with a SIM, a curved reflector can be positioned to reflect the central light propagating toward the SIM bottom opening. This light is not reflected from SIM sidewall and therefore, will not contribute to NFT efficiency.

Figure 17:
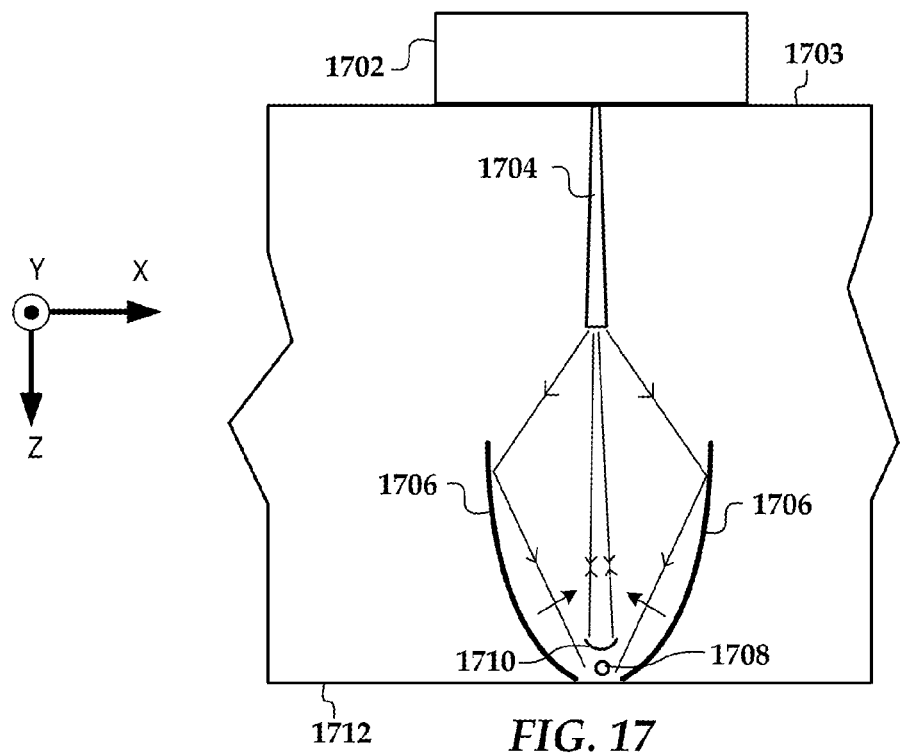
FIGS. 17 and 18 are block diagrams showing a reflectors according to other example embodiments.

In the embodiment shown in FIG. 17, light is emitted from a laser diode 1702 where it is coupled into a three-dimensional channel waveguide of a slider body 1703 by a waveguide input coupler 1704. Light exiting the input coupler 1704 is coupled to a slab waveguide, where it is focused by a SIM 1706 onto a near-field transducer 1708 that is located at a focal region of the SIM 1706. The near-field transducer 1708 is configured similarly to the near-field transducer 412 in FIG. 4, and is proximate, in a downtrack direction, to a write pole (not shown) that extends toward a media-facing surface 1712 of the slider body 1703. A curved reflector 1710 is located between the near-field transducer 1708 and laser diode 1702, in this case upwards from the focal region of the SIM 1706 away from the media-facing surface 1712. The curved reflector 1710 is in a bottom cladding layer of the slab waveguide and has a convex side facing the media-facing surface 1712. The reflector 1710 reduces reflection of the energy from a recording medium back to the energy source 1702.

Figure 18:
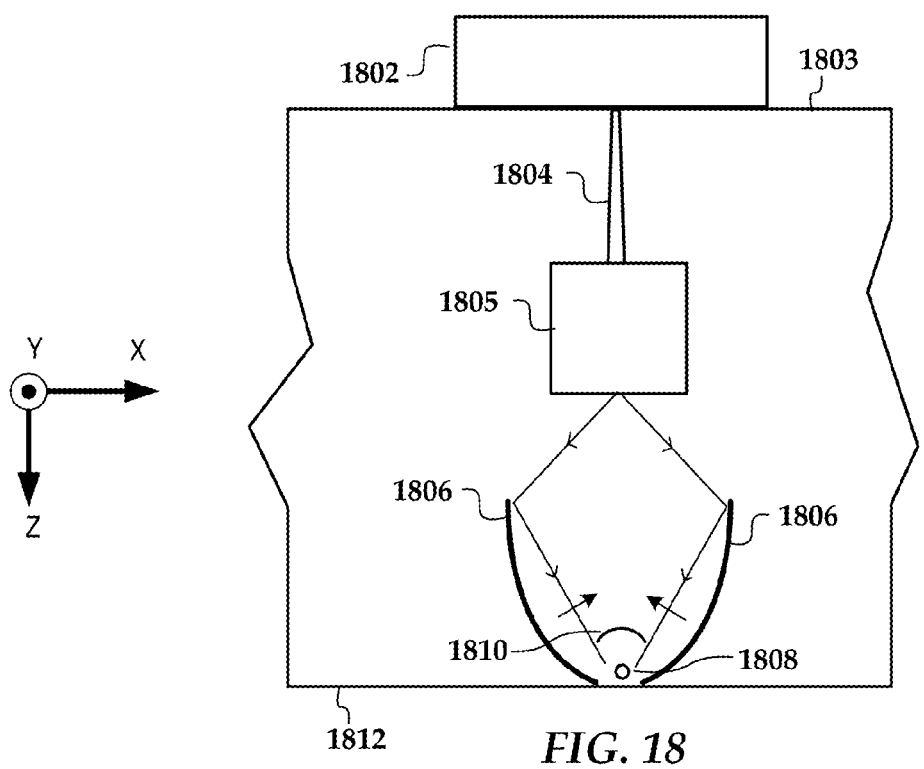

In the configuration shown in FIG. 18, light is emitted from a laser diode 1802 where it is coupled into a three-dimensional channel waveguide of a slider body 1803 by a waveguide input coupler 1804. A waveguide mode order converter and/or a polarization rotator 1805 may be integrated in the light path for near-field transducer excitation. Light exiting the converter/rotator 1805 is coupled to a slab waveguide, where it is focused by a solid immersion mirror (SIM) 1806 etched into the slab waveguide. The SIM 1806 reflects the light onto a near-field transducer 1808 which is located at a focal region of the SIM 1806. The near-field transducer 1808 is configured similarly to the near-field transducer 412 in FIG. 4, and is proximate, in a downtrack direction, to a write pole (not shown) that extends toward a media-facing surface 1812 of the slider body 1703. A curved reflector 1810 is located between the near-field transducer 1808 and laser diode 1802, in this case upwards from a focal region of the SIM 1806 away from the media-facing surface 1812. The curved reflector 1810 is in a bottom cladding layer of the slab waveguide and has a concave side facing the media-facing surface 1812. The reflector 1810 reduces reflection of the energy from a recording medium back to the energy source 1802.

It will be understood that a HAMR write head may use a combination of reflectors and other features described above. For example, write head utilizing SIM light delivery may use a combination of curved reflectors located at or away from the near-field transducer with a rectangular slab reflector at or away from the near-field transducer. A write head utilizing $TE_{10}$ waveguide mode light delivery may also use similar combinations of reflectors.

The previous examples included reflectors that reduce reflections from a recording medium and writer that propagate back to an energy source and thereby causing optical feedback. However, there are other sources of reflection in a HAMR write head, and the embodiments shown below include reflectors and other features that mitigate these reflections as well. Generally, a reflector may be used anywhere (e.g., an inter-component interface) that a discontinuity in a light delivery path causes reflection due to impedance mismatch. In reference again to FIGS. 3 and 4, potential interfaces with reflection-inducing discontinuities include the output of laser diode 302, 402, top and bottom of input coupler 304, 404, top and bottom of converter/rotator 306, 406. For example, at the interface between air (or laser facet) and top of input coupler 304, 404, the reflection is 5-10%. As previously noted, light is reflected from the writer (including near-field transducer, magnetic pole, and heat-sink) and from the interface between the slider and the recording medium.

Figure 19:
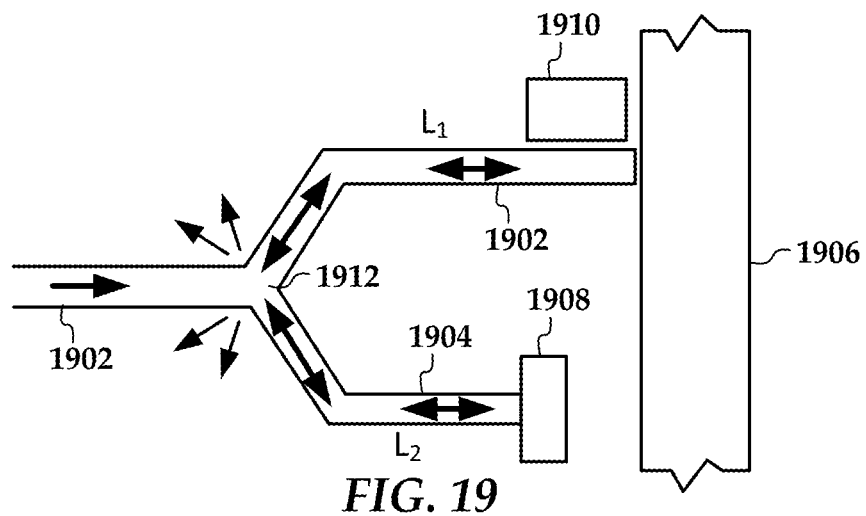
FIG. 19 is a block diagram showing a conceptualization of light cancelling mechanisms according to various embodiments.

In FIG. 19, a block diagram shows a conceptualization of light cancelling mechanisms according to various embodiments. Light propagating along a waveguide 1900 is split by a waveguide tap into two branches 1902, 1904. The top branch 1902 delivers light into a recording medium 1906 near writer 1910. Part of the light gets reflected, with (complex) reflection coefficient $r_1 (=|r_1|e^{j\Phi_1})$. The bottom branch 1904 meets a reflector 1908, with reflection coefficient $r_2 (=|r_2|e^{j\Phi_2})$. The two reflected beams interfere at the waveguide joint 1912. If the condition shown in Expression (1) is satisfied, the reflected light will radiate out the waveguide and there will be no return light back to the input source where $\beta_1$ ($\beta_2$) denotes the propagation constant of the top (bottom) waveguide branch, $L_1$ ($L_2$) is the propagation length from the waveguide joint to the end (to the reflector). This results in the relationships shown in Expressions (2) and (3).

$$|r_1|e^{j(\phi_1+2\beta_1 L_1)}+|r_2|e^{j(\phi_2+2\beta_2 L_2)}=0 \quad (1)$$

$$|r_1|=|r_2| \quad (2)$$

$$(\phi_1-\phi_2)+2(\beta_1 L_1-\beta_2 L_2)=(2m+1)\pi, m=\ldots -1,0,1, \quad (3)$$

Figure 20:
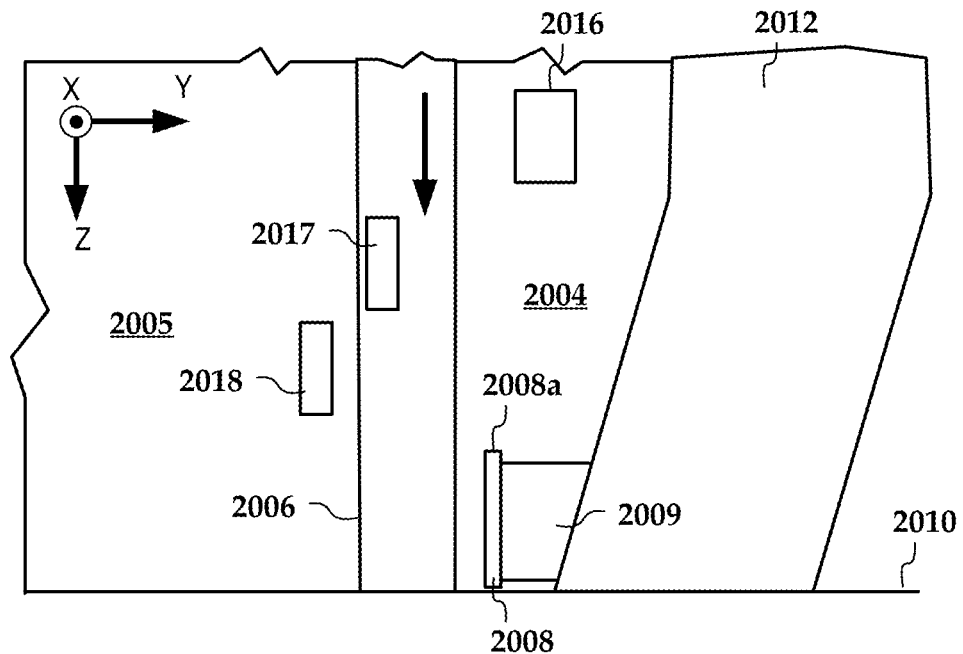
FIGS. 20 and 21 are block diagrams showing additional reflector embodiments.
Figure 21:
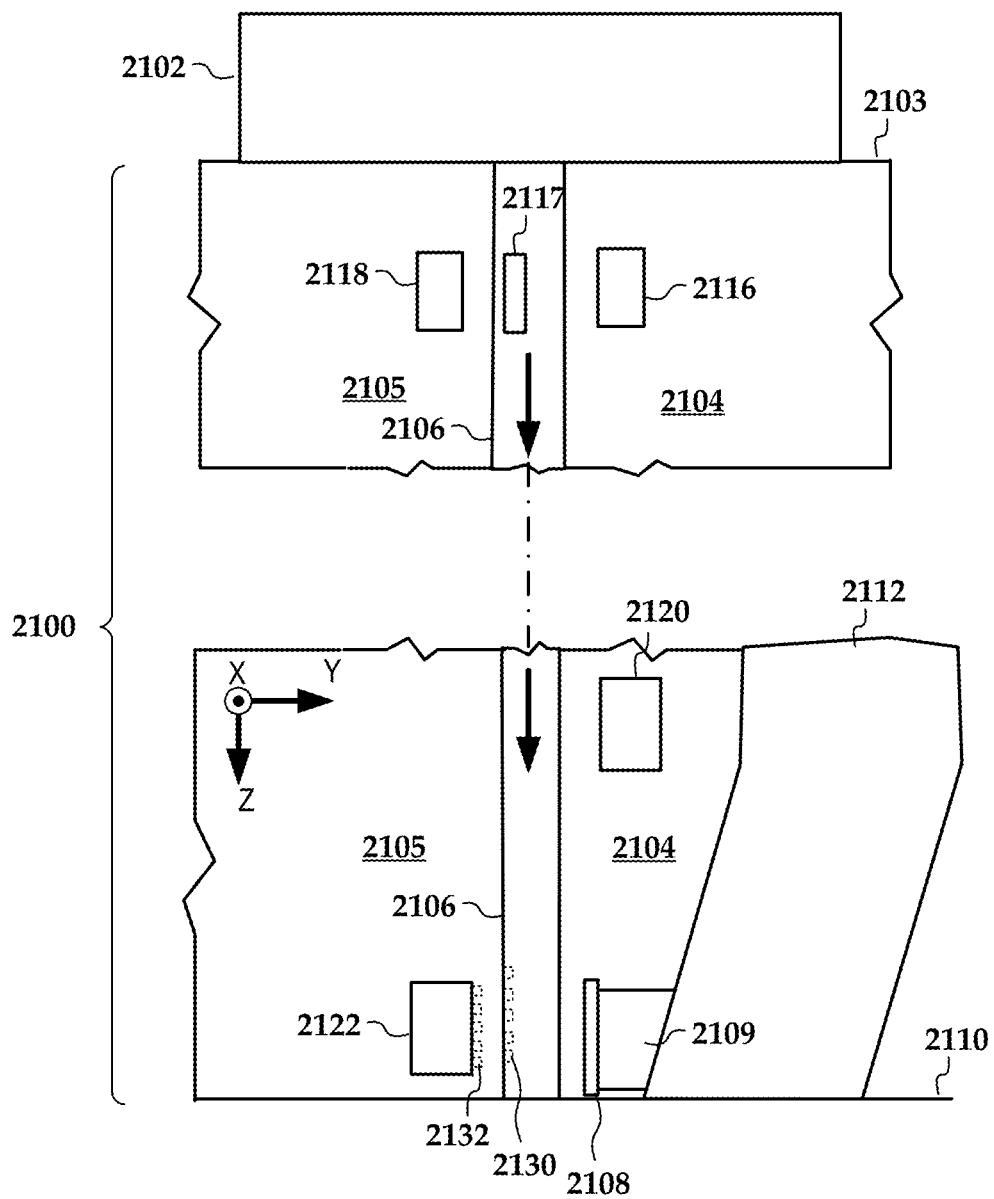

Expressions (2) and (3) can be fulfilled by choosing the proper waveguide tap, reflection from the reflector, and position of the reflector, $L_2$ for a given media and writer design. In a HAMR drive, wavelength variations may be in the range of ±20-nm. To minimize the wavelength sensitivity, a broad-band reflector can be used that minimizes phase difference from light path, $2(\beta_1 L_1-\beta_2 L_2)$, and m=±1. In FIGS. 20 and 21, block diagrams show additional embodiments that can be used cancel reflections from media and writer, as well as other reflection sources noted above. Generally, the components in FIGS. 20 and 21 may be configured similarly (e.g., similar materials, dimensions, etc.) to corresponding elements described in FIGS. 5 and 6 and elsewhere. Further, any of the light delivery arrangements (e.g., SIM, $TE_{10}$ waveguide, use of converter/rotator) may be applicable to the configurations shown in FIGS. 20 and 21.

In FIG. 20, a waveguide includes a top cladding layer 2004 and bottom cladding layer 2005 surrounding a waveguide core 2006. Light is delivered to a near-field transducer 2008. A heat sink 2009 conducts heat from the near-field transducer 2008 to a write pole 2012 which is located proximate a media-facing surface. In one embodiment, a reflector 2016 faces a side 2008a of the near-field transducer 2008 that faces away from the media facing surface 2010. This places the reflector 2016 between the core 2006 and the write pole 2012.

In another embodiment, a reflector 2017 is placed in the waveguide core 2006. The reflector 2017 is spaced away from the near-field transducer 2008 in both the z-direction and y-direction (downtrack). In yet another embodiment, a reflector 2018 is located in the bottom cladding layer 2005 spaced away from the near-field transducer 2008 in both the z-direction and y-direction. These reflectors 2016-2018 may be used in any combination, and each of the reflectors 2016-2018 may be configured in any geometry described herein (e.g., rectangular slab, disk, curved) and may be formed of any materials described herein (e.g., Au, Ag, Al, absorbing material, etc.).

In FIG. 21, a slider body 2100 includes features that suppress the reflection from a slider surface where that interfaces with an energy source. The slider body 2100 includes a waveguide with a top cladding layer 2104 and bottom cladding layer 2105 surrounding a waveguide core 2106. Light is delivered from an energy source 2102 (e.g., laser diode mounted at a top surface 2103 of the slider body 2100) to the waveguide, which couples the light to a near-field transducer 2108 near a media-facing surface 2110. A heat sink 2109 conducts heat from the near-field transducer 2108 to a write pole 2112.

In various embodiments, reflectors 2116-2118 are placed near the top surface 2103 in the bottom cladding layer 2104, core 2106, and top cladding layer 2105, respectively. The slider body 2100 may include only one of the reflectors 2116-2118, or any combination thereof. Also, one or more of the reflectors 2116-2118 may be used in combination with other reflectors described elsewhere herein. For example, reflectors 2120, 2122 are shown located near the writer, similar to reflectors 2016 and 2018 in FIG. 20. These reflectors 2120, 2122 may be used in any combination with one or more of the reflectors 2116-2118. As indicated by dashed lines 2130, 2132, a reflector near the near-field transducer 2108 can be formed as a distributed Bragg grating, formed in the waveguide core 2106 and/or away from the core 2106.

In these embodiments, optical feedback suppression can be achieved by adjusting the amount of reflection and relative phase from the reflection interface by proper positioning the reflector, as shown in Expressions (2) and (3) above. The reflector(s) can be formed of a metallic material (e.g., Au, Cu, Ag, Al W, Ta, . . . ) and/or include a block of dielectric material which has an index of refraction significantly different from its environment. The reflectors may be configured as a periodic diffraction grating, formed from either dielectric or metallic materials.

The reflectors may also include absorbing materials, or be configured instead as an absorber. For example, a reflector/absorber may be made entirely from a light-absorbing material, or be layered such that one side (e.g., a side facing the ABS) is reflective and the opposing side (e.g., side facing the laser) is absorptive. If the reflector includes an absorbing material, it could be also used as a temperature sensor (e.g., a bolometer) to monitor light intensity in the optical path. This can be achieved by running a current through the reflector/absorber and monitoring changes in the current induced by a change in resistance of the reflector/absorber due to a temperature coefficient of resistance inherent in the reflector/absorber material.

As shown above, a reflector may be placed overlapping a near-field transducer (e.g., in a bottom cladding layer) without significantly impacting coupling efficiency. In some configurations (e.g., as noted for SIM light deliver) such a structure may improve coupling efficiency of a HAMR writer. In the following discussion, particular forms of a reflector that overlaps the near-field transducer are described that can improve thermal gradient of the media hotspot. Generally, a higher thermal gradient improves drive performance (e.g., lowering bit error rate) due to, e.g., more distinct magnetic transitions at bit boundaries.

In HAMR designs described above, laser light is generally delivered by slab or channel waveguides to excite the near-field transducer. Because the near-field transducer is sitting above the waveguide core (e.g., in the top cladding layer) it can have good interaction with the top portion of the waveguide mode profile. However, the optical field also extends at the other side of waveguide core (e.g., the bottom cladding layer) that faces away from the near-field transducer. This other field generally cannot be fully utilized for near-field transducer excitation, resulting in background heating in the media recording layer.

In this application, placing a metallic structure (e.g., gold cylinder) on a side of the waveguide core facing away from the near-field transducer can locally push up the waveguide mode profile. The metallic bottom clad cylinder stops the optical field and forces it to move upwards. Therefore, the near-field transducer can harvest more light and provide a better thermal spot (e.g., more localized heating) with much less direct waveguide heating. This mode shaping cylinder can also serve as a reflector as previously described. In FIG. 22, a perspective view shows a mode-shaping reflector 2200 according to an example embodiment. The reflector 2200 is configured as a rounded disc (e.g., circular, stadium, oval) in-plane (e.g., parallel to XZ plane) shape located on a side 2204a of a waveguide core 2204 that faces away from a near-field transducer 2202. In this example, the near-field transducer 2202 is configured with a circular base (e.g., similar to NFT 412 in FIG. 4) and includes a peg 2202a formed of a different material than the rest of the near-field transducer 2202. The near-field transducer also includes a heat sink 2202b that faces a write pole (not shown).

The shape of the reflector 2200 corresponds to the base shape of the near-field transducer 2202 (e.g., both being disc-shaped), and this correspondence may hold for other base shapes, e.g., a stadium-shaped NFT, rectangular-shaped NFT, etc. The peg 2202a of the near-field transducer 2200 may be formed from a more thermally robust material than the rest of the near-field transducer 2202. This type of peg may be used in any of near-field transducers described above (e.g., NFT 312 in FIG. 3), and the example in FIG. 22 may alternatively use a peg that is of the same material as the rest of the near-field transducer 2202.

As indicated by region 2200a, the reflector 2200 may include an enlarged portion 2200a that is spaced away from the core 2204 and near-field transducer 2200. This may provide additional heat sinking and reflection while minimizing impacts on the near-field resonance of the transducer 2200. In FIG. 23, a near-field transducer 2302 includes a different-material peg 2302a, heat sink 2302b, and a sunken region 2302c that extends below the peg 2302a. Otherwise, the configuration in FIG. 23 may be the similar as that shown in FIG. 22, including the optional enlarged portion 2200a of the reflector 2200. In FIG. 24, a plan view shows a substrate-parallel (xz-plane) view that is applicable to the embodiments of both FIGS. 22 and 23. The reflector 2200 overlaps the near-field transducer 2200, 2300 in a direction normal to the substrate parallel plane.

Figure 25:
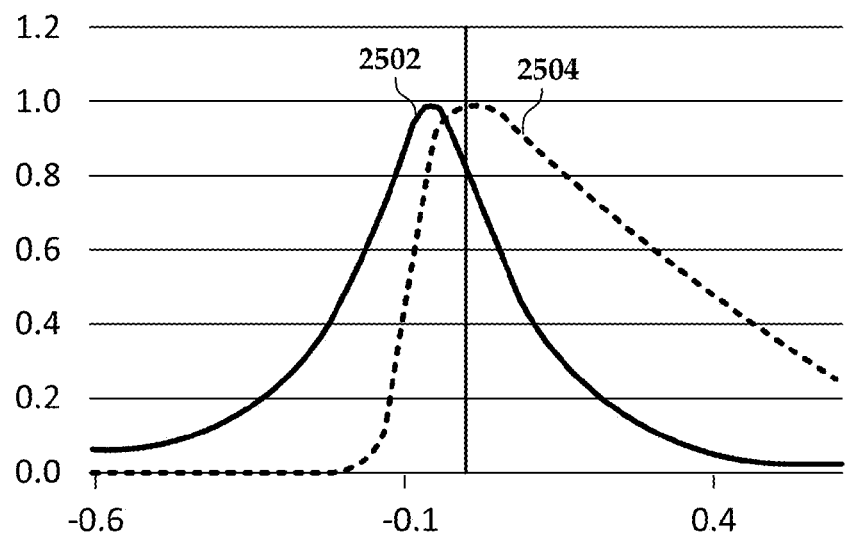
FIG. 25 is a graph showing a comparison of thermal mode profiles using a near-field transducer and reflector according to an example embodiment.
Figure 26:
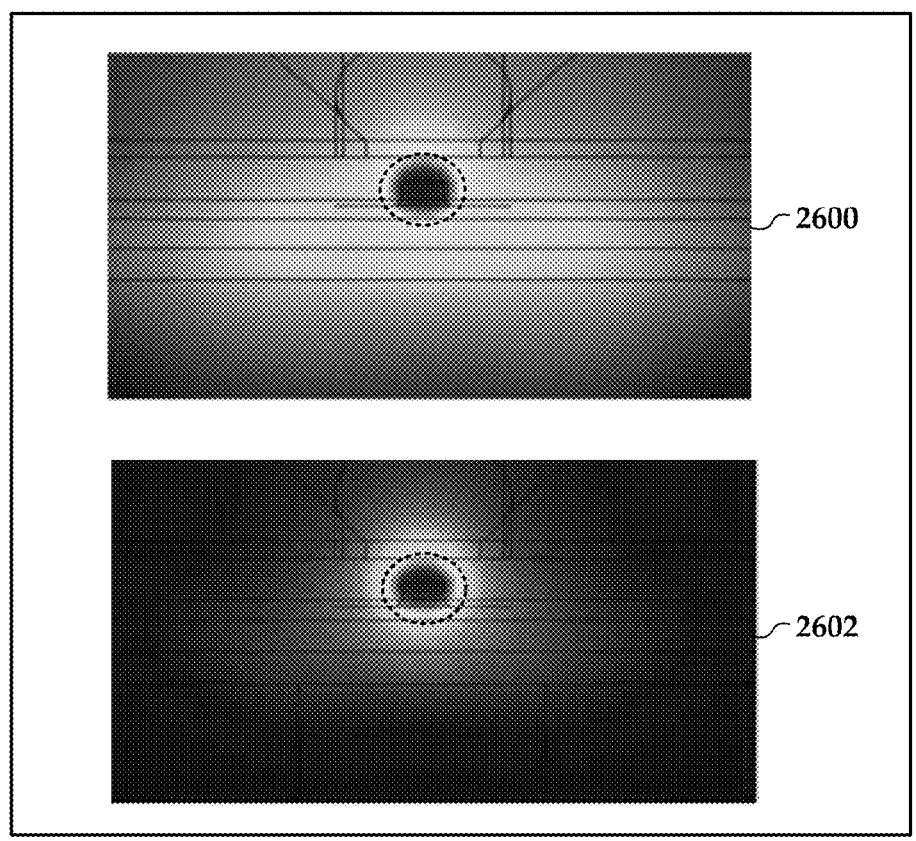
FIG. 26 is a set of plots of two-dimensional thermal profiles of a near-field transducer according to an example embodiment.

In FIG. 25, a graph shows a comparison of thermal mode profiles using a near-field transducer and reflector as in FIG. 22 (curve 2504) and without a reflector, e.g., a $SiO_2$ bottom cladding layer (curve 2502). The vertical axis represents a normalized temperature at the media and the horizontal axis represents a distance from the top of the near-field transducer peg. As seen by curve 2504, the mode shaping reflector increases thermal gradient near the center of the peg (around −0.1 on the horizontal axis). In FIG. 26, plots 2600, 2602 are two-dimensional thermal profiles of a near-field transducer as shown in FIG. 22 without and with a reflector, respectively. The dashed circles highlight a region surrounding the near-field transducer peg as seen from the media-facing surface. Inside the circles, a darker shade indicates a higher relative temperature, while outside the circles a darker shade indicates a lower relative temperature. As plot 2602 indicates, there is much less background heating of the regions outside the circle. A similar effect is seen with optical energy, which is more tightly confined around the near-field transducer when a mode-shaping reflector is used.

The increase in media heating efficiency and thermal gradient gained by using a mode-shaping reflector can also reduce down-track erasure and adjacent track erasure. In addition to the indicated near-field transducer shown in FIGS. 22 and 23, an analysis was performed for an NFT as in FIG. 4 using direct delivery via a dual core waveguide. In such a case, the thermal gradient was increased by up to 18% and media heating efficiency was improved by up to 10% using a mode-shaping reflector. Using the configuration shown in FIG. 23 with a sunken disk, thermal gradient improvement of 32% is achieved by adding the mode-shaping reflector. The concept can also be applied to channel waveguide design. For the configuration shown in FIG. 22, thermal gradient is increased by 16% with the mode-shaping reflector. Due to the increased media/head absorption and disk scattering, the reflected light to the laser is also reduced.

Figure 27:
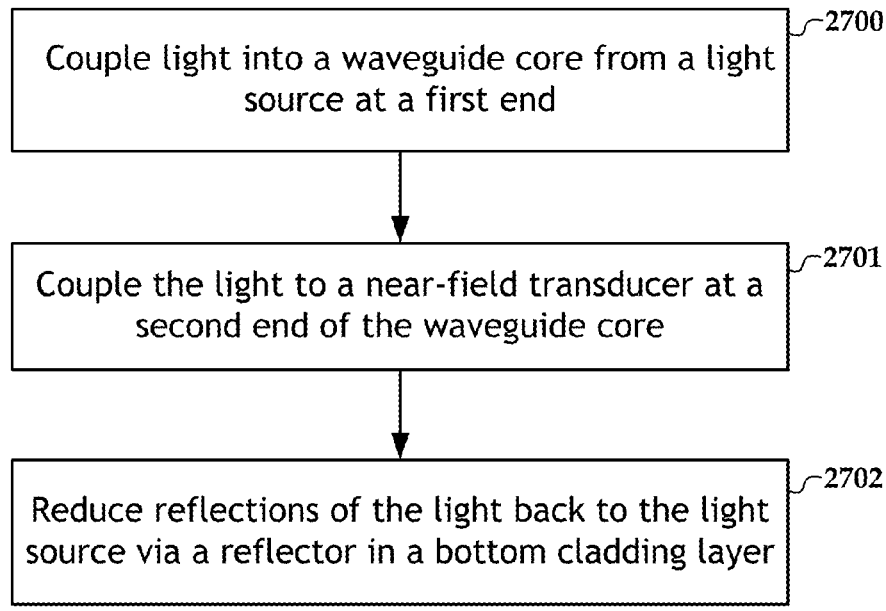
FIGS. 27 and 28 are flowcharts illustrating methods according to example embodiments.

In FIG. 27, a flowchart illustrates a method according to an example embodiment. The method involves coupling 2700 light into a waveguide core from a light source at a first end, the core having a second end proximate a near-field transducer. The light is coupled 2701 to the near-field transducer at the second end. Reflections of the light back to the light source are reduced 2702 via a reflector in bottom cladding layer. The bottom cladding layer faces away from a write pole that is located proximate to the near-field transducer. The reflector may include a disk or a rectangular metal plate, and may be proximate the energy source or proximate a media-facing surface, e.g., overlapping the near-field transducer.

Figure 28:
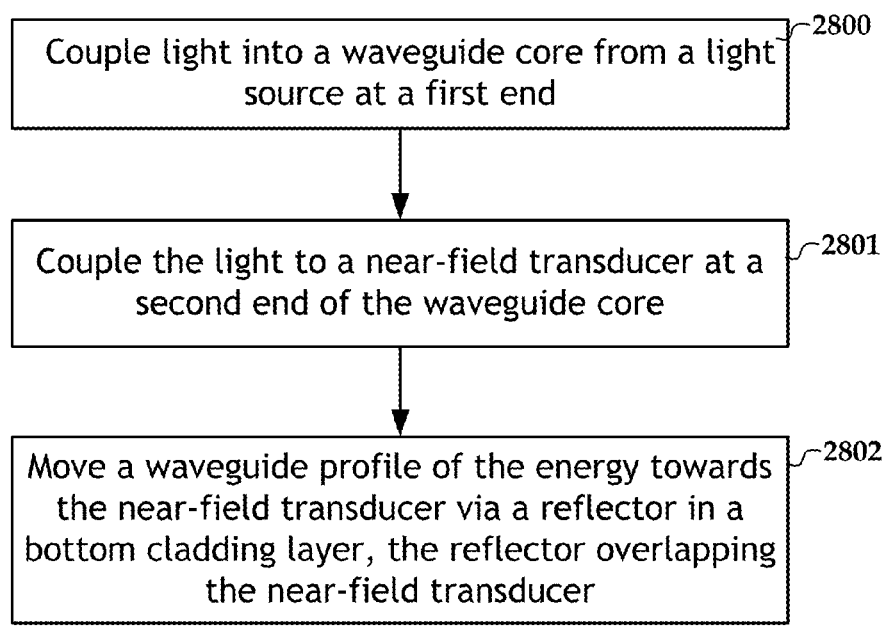

In FIG. 28, a flowchart illustrates a method according to an example embodiment. The method involves coupling 2800 light into a waveguide core from a light source at a first end, the core having a second end proximate a near-field transducer. The light is coupled 2801 to the near-field transducer at the second end. A reflector in the bottom cladding layer overlaps the near-field transducer and configured to moves 2802 a waveguide profile of the energy towards the near-field transducer. The bottom cladding layer faces away from a write pole that is located proximate to the near-field transducer. The reflector may include a shape that corresponds to a rounded base of the near-field transducer Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
   a waveguide that delivers energy from an energy source, the waveguide comprising a first cladding layer facing a write pole, a second cladding layer, and a core between the first and second cladding layers;
   a near-field transducer configured to receive the energy from the waveguide and deliver the energy to a recording medium; and
   a reflector in the second cladding layer, the reflector configured to reduce reflection of the energy from the recording medium back to the energy source.

2. The apparatus of claim 1, wherein the reflector is proximate a discontinuity in a light delivery path between the energy source and the near-field transducer, the discontinuity causing the reflection due to impedance mismatch, the reflector cancelling reflections from the discontinuity.

3. The apparatus of claim 1, wherein a projection of the reflector on to a substrate-parallel plane overlaps the near-field transducer.

4. The apparatus of claim 3, wherein the near-field transducer comprises a rounded base with a peg extending therefrom, and the reflector comprises a shape that corresponds to that of the rounded base.

5. The apparatus of claim 1, wherein the reflector comprises a distributed Bragg reflector grating.

6. The apparatus of claim 1, wherein the reflector is proximate the energy source.

7. The apparatus of claim 1, further comprising a second reflector in the top cladding layer.

8. The apparatus of claim 7, wherein the second reflector is proximate a media-facing surface.

9. The apparatus of claim 7, wherein the second reflector is proximate the energy source.

10. The apparatus of claim 1, further comprising a second reflector in the core.

11. The apparatus of claim 10, wherein the second reflector is proximate a media-facing surface.

12. The apparatus of claim 10, wherein the second reflector is proximate the energy source.

13. The apparatus of claim 1, wherein the reflector comprises an absorptive material.

14. The apparatus of claim 13, wherein a first side of the reflector comprises the absorptive material and a second side of the reflector comprises a reflective material.

15. An apparatus, comprising:
    a write pole extending towards a media-facing surface;
    a solid immersion mirror proximate the write pole;
    a waveguide that delivers energy from an energy source, the waveguide comprising a top cladding layer facing the write pole, a bottom cladding layer facing away from the write pole, and a core between the top cladding layer and the bottom cladding layer;
    a near-field transducer located at a focal region of the solid immersion mirror in the top cladding layer and configured to receive the energy from the solid immersion mirror and deliver the energy to a recording media; and
    a curved reflector positioned centrally within the solid immersion mirror in the bottom cladding layer, the curved reflector reflecting the energy away from the near-field transducer.

16. The apparatus of claim 15, wherein the curved reflector comprises a convex side facing towards the media-facing surface.

17. The apparatus of claim 15, wherein the curved reflector comprises a concave side facing towards the media-facing surface.

18. An apparatus, comprising:
    a waveguide that delivers energy from an energy source, the waveguide comprising a first cladding layer, a second cladding layer, and a core between the first cladding layer and the second cladding layer;
    a near-field transducer in the first cladding layer and configured to receive the energy from the energy source and deliver the energy to a recording medium, the near-field transducer comprising a rounded base; and
    a reflector in the second cladding layer, the reflector overlapping the near-field transducer and configured to move a waveguide mode profile of the energy towards the near-field transducer.

19. The apparatus of claim 18, wherein the reflector comprises a shape that corresponds to the rounded base of the near-field transducer.

20. The apparatus of claim 18, wherein the reflector and the near-field transducer are both formed of noble metals.

* * * * *